April 12, 1960 — W. J. METZGER — 2,932,410
COUPLER AND YOKE CONNECTION
Filed Jan. 29, 1958 — 2 Sheets-Sheet 1
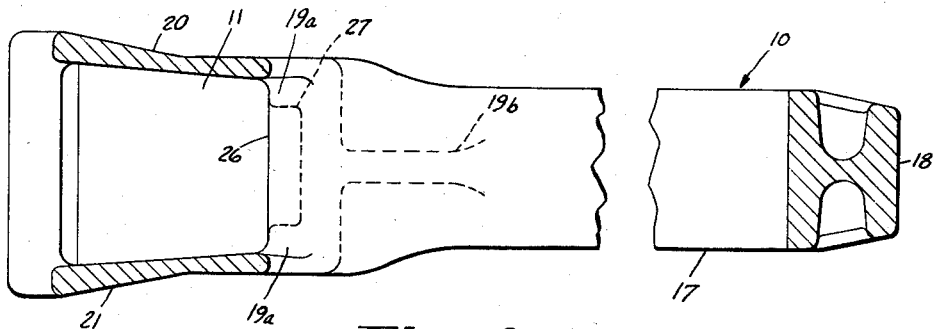
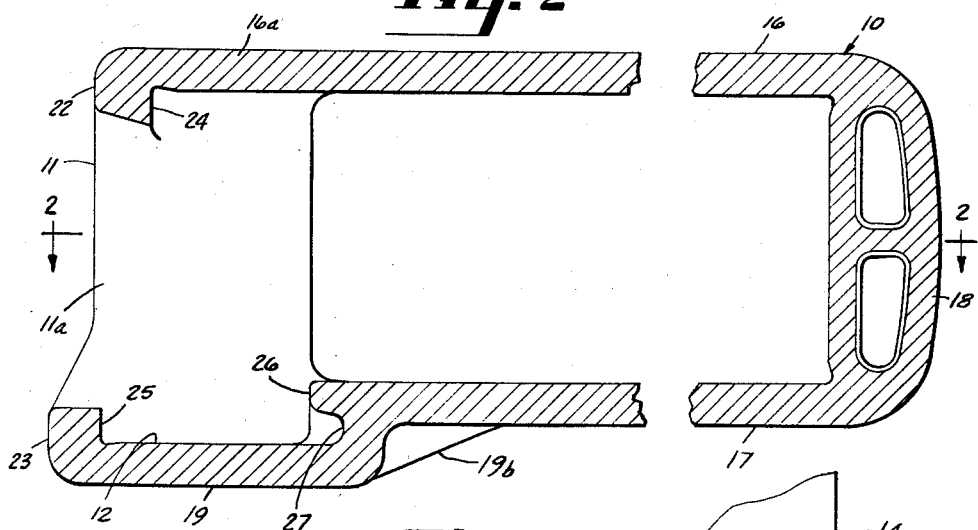
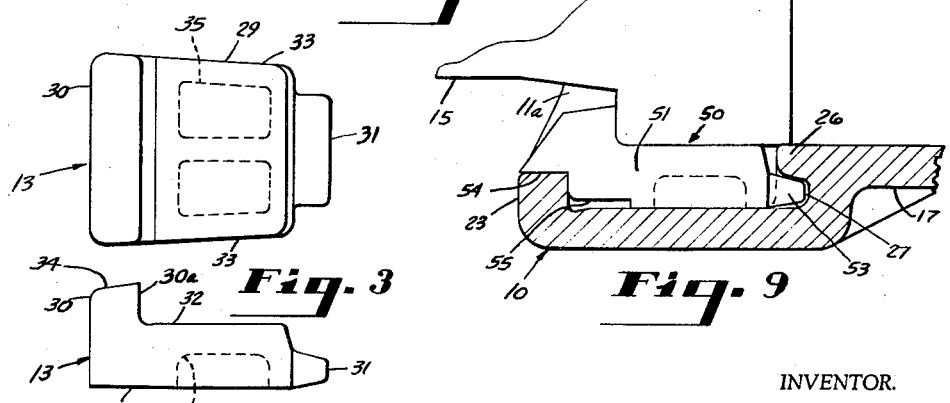
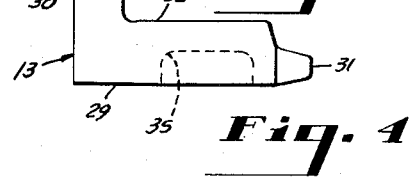
INVENTOR.
WILLIAM J. METZGER
BY Henry Kozak
ATTORNEY April 12, 1960 W. J. METZGER 2,932,410
COUPLER AND YOKE CONNECTION
Filed Jan. 29, 1958 2 Sheets-Sheet 2

INVENTOR.
WILLIAM J. METZGER
BY Henry Kozak
ATTORNEY

United States Patent Office 2,932,410
Patented Apr. 12, 1960

2,932,410
COUPLER AND YOKE CONNECTION

William J. Metzger, East Cleveland, Ohio, assignor to National Malleable and Steel Castings Company, Cleveland, Ohio, a corporation of Ohio Application January 29, 1958, Serial No. 712,031

5 Claims. (Cl. 213—70)

This invention relates to a keyless yoke for railway vehicles and to improvements in coupler and yoke connections.

The invention broadly comprises a keyless yoke having a hollow head portion formed by top, bottom, and side walls which also has the usual front opening therein for receiving the butt end of a coupler shank for assembly with and operative connection to the yoke. Pocket means are provided in the said hollow head portion to receive a retaining block inserted through the front opening to, in effect, lock the coupler and yoke in operatively connected relationship. A special feature of the invention is in the means provided for preventing the retaining block from interfering with coupler action, particularly when pulling forces are applied.

An object of this invention is to eliminate the use of bolts and rivets to connect the coupler shank to the yoke, especially in those constructions involving a coupler having a liner-block type or shouldered-butt end shank and a simple U-shaped type yoke.

Another object is to provide, in the above arrangement, a coupler and keyless yoke connection in which the coupler may be readily and efficiently attached to and detached from the yoke.

A further object is in the use of a single retaining block to obtain and maintain the connection of the coupler and yoke, the coupler in said connection being in shouldered engagement with both the yoke and retaining block.

A still further object is to provide means in the yoke for receiving the retaining block directly through the opening in the hollow portion to eliminate the necessity of additional openings in the yoke for lateral insertion of the retaining block.

Still another object is to provide means for preventing the retaining block from undesirably tilting and pinching against the coupler butt during coupler action.

These and other objects will become apparent upon reading the following specification, considered and interpreted in the light of the accompanying drawings, in which:

Fig. 1 is a side view, in vertical section, of a yoke embodying the invention.

Fig. 2 is a view taken substantially along the lines 2—2 of Fig. 1.

Fig. 3 is a top plan view of the retaining block constructed in accordance with the invention.

Fig. 4 is a side view of the retaining block.

Fig. 9 is a partial assembly view showing the use of a modified retaining block.

Figure 5:
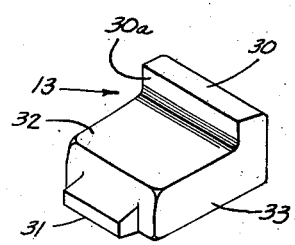
Fig. 5 is an isometric view of the retaining block.
Figure 6:
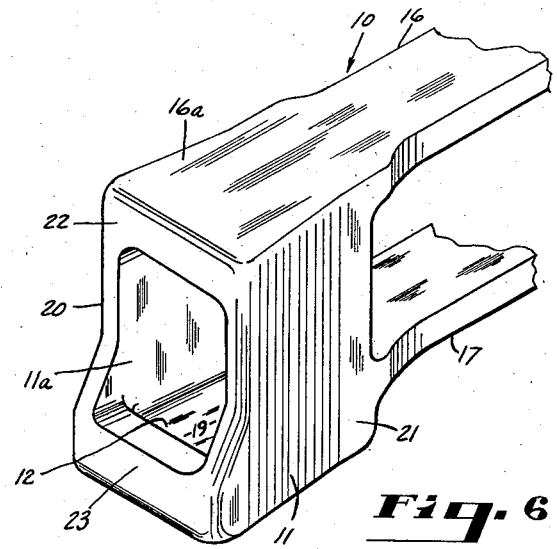
Fig. 6 is a partial isometric view of the yoke.

Referring now to Figs. 1 to 8 of the drawings, there is disclosed in this invention a yoke 10 comprising a hollow head portion 11 with the usual front opening 11a and having pocket means 12 therein for receiving a retaining block 13 to engage the shouldered butt-end 14 of the coupler 15 in connected relationship with respect to the yoke 10.

The yoke 10 is shown as comprising horizontally spaced straps or arms 16 and 17 joined at their rearward ends by a vertical rear wall section 18. Hollow head portion 11 is formed by top wall 16a which is a continuation of arm 16, bottom wall 19 which is a downwardly offset portion of arm 17, and side walls 20 and 21. The forward end of top wall 16a is extended downwardly to form lug 22 and bottom arm 19 is extended upwardly to form lug 23; each lug 22 and 23 presenting, interiorly thereof, rearwardly facing transverse abutment surfaces 24 and 25, respectively. A flange 26 is formed by a slight forward continuation of bottom arm 17 and overlies a portion of bottom wall 19 to define therewith a groove 27. In order to provide increased strength of the yoke adjacent the groove 27, the rearward side portions of bottom wall 19 are thickened as is clearly shown at 19a in Figure 2. Bottom wall 19 is additionally reinforced through use of the web 19b connecting between bottom wall 19 and arm 17. Flange 26, groove 27, bottom wall 19, and lug 23 define the aforementioned pocket means 12. From Fig. 1 it will be seen that lug 23 is disposed forwardly a greater distance than lug 22 for a purpose which will hereinafter become evident.

The retaining block 13 comprises a base portion 29, an integral, upwardly extending transverse front abutment wall 30 and a rearwardly extending projection 31. From Figs. 3 and 4 it will be clearly seen that projection 31 is offset both with respect to the top surface 32 and the side walls 33 of base portion 29. It will also be seen that base portion 29 is hollowed-out, as at 35, to lighten the member. The top surface of wall 30 is bevelled downwardly in a forward direction, as at 34, for a purpose that will hereinafter become clear.

Figure 7:
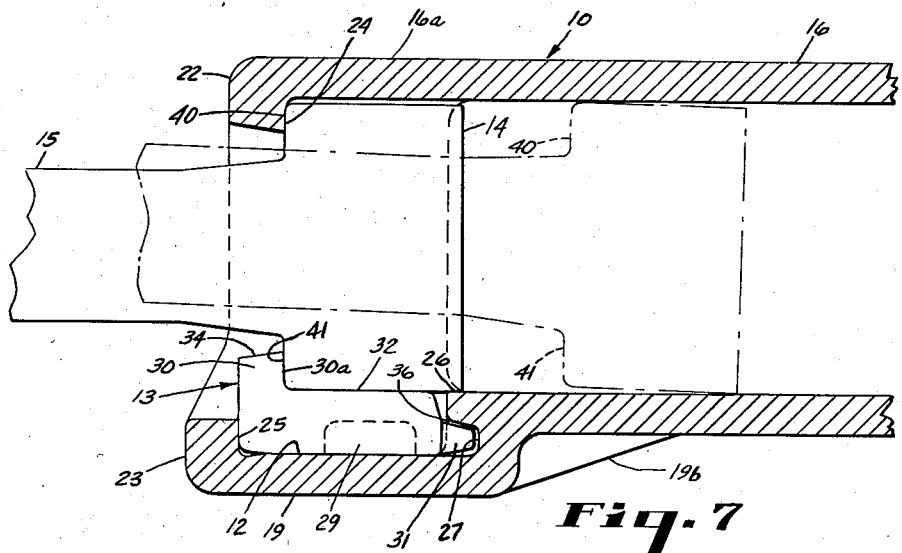
Fig. 7 is a side view, partly in section, showing the assembled relationship between the yoke, retaining block and coupler shank. The dot-dash lines represent the position of the coupler shank when it is pushed rearwardly between the yoke arms during the assembly process to allow insertion of the block.
Figure 8:
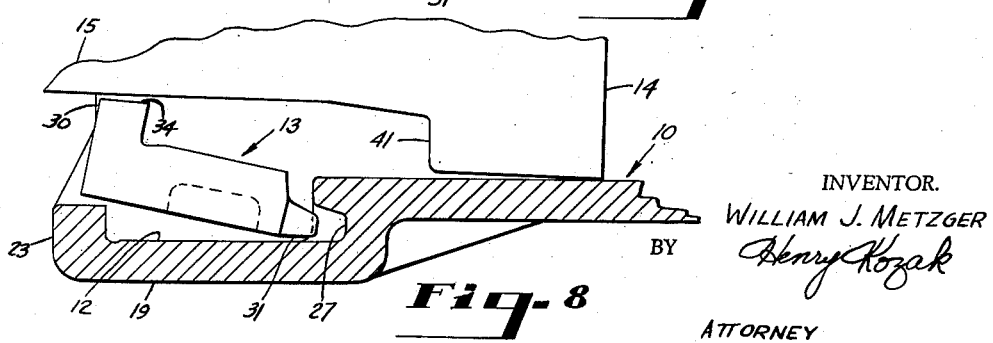
Fig. 8 is a view, partly in section, showing the position of the parts during a phase of the assembly.

In assembling the connection, butt portion 14 of the coupler 15 is inserted through the front opening 11a in the hollow head portion 11 of the yoke 10 and is slightly tilted upwardly as it is pushed rearwardly between the arms 16 and 17, as is shown in the dot-dash lines in Fig. 7. Also apparent from Fig. 7 is the fact that the coupler butt end 14 is moved rearwardly beyond pocket 12. With the coupler 15 and the butt end 14 in position in the yoke, as just described, retaining block 13 is inserted through the opening 11a in the front end of the hollow portion 11 of the yoke 10 and positioned within the pocket 12. It is to be understood that with the coupler 15 in the dot-dash position, ample clearance exists between the underside of the shank of coupler 15 and lug 23 to permit the block 13 to be easily moved therebetween for insertion into pocket 12. This phase of the assembly is clearly shown in Fig. 8 in which it will be seen that the bevelled top surface 34 of the block 13 allows the block to be slightly tilted to assure proper positioning thereof relative to pocket 12, especially with respect to the entry of projection 31 into groove 27.

Coupler 15 is then moved forwardly in the yoke 10 until the top transverse shoulder 40 of the butt end 14 comes into engagement with abutment surface 24 and bottom transverse shoulder 41 on butt end 14 engages surface 30a of wall 30 on retaining block 13. Block 13 is retained in position against forward movement by the engagement between abutment wall 30 and transverse abutment surface 25. It will also be seen that base portion 29 of retaining block 13 is of such a thickness as to assure that top surface 32 thereof will be in substantially the same horizontal plane with the top surfaces of flange 26 and arm 17, so as not to present any interference in the movements of the butt 14 forwardly to the assembled position. It will be understood that coupler 15 is permitted to move rearwardly to transmit buffing forces to an associated draft gear (not shown). The co-planar relationship between top surface 32 of the retaining block 13 and the top surfaces of flange 26 and arm 17 assures that no interference will occur during this important phase of coupler action. Also to be noticed is the engagement between surfaces 40 and 24 and surfaces 41 and 30a, occurring on substantially the same vertical plane, which contributes to efficient coupler action during the period when pulling strains are applied to the coupler.

Retaining block 13 is prevented from tilting out of position during vertical and horizontal angling of the coupler 15 due to the engagement between projection 31 and groove 27. As will be seen from Fig. 7, a slight clearance is provided, as at 36, which will permit slight rocking of the retaining block 13 during pulling action of the coupler in service. This clearance, however, is sufficiently limited to prevent the retaining block 13 from pivoting upward, against the underside of the butt end 14 of the coupler 15, an amount to cause the top surface of the butt end to be pinched against top wall 16a and resist horizontal angling of the coupler during pulling operations. The avoidance of any such pinching of butt 14 against the top wall of the yoke provides an important feature of the invention. A draft gear (not shown) is customarily inserted rearwardly of butt end 14 after the above described connection has been accomplished.

Fig. 9 shows the assembled position of a modified retaining block 50. The yoke and the associated coupler are identical to those described in the preferred embodiment and similar reference numerals are therefore employed to designate these parts.

Retaining block 50 comprises a base portion 51, an upstanding transverse front abutment wall 52, and a rearwardly extending projection 53. Front wall 52 of block 50 has been extended forwardly so as to form a downwardly facing abutment surface 54 for engagement with the top surface of lug 23 on yoke 10. A segment of base portion 51 has been relieved as at 55 to facilitate insertion of block 50 into the yoke. The assembly of the block 50 with the yoke 10 and the coupler 15 is effected in exactly the same manner as that described with the preferred embodiment. In the assembled condition, abutment surface 54 engages the top surface of lug 23 on the yoke 10 and as before, projection 54 is received in the groove 27 in the yoke. Engagement between the surface 54 and the top surface of lug 23 provides increased resistance to rocking of block 50 about the lug during the transmission of pulling forces from the coupler to the yoke. More specifically, the rocking of the block under pulling action of the coupler is now transferred to the front edge of the top surface of lug 23. In the event sufficient pulling load is applied by the coupler against lug 23 to cause the block to rock upward, such rocking movement will be limited by the engagement of projection 53 in groove 27. Moreover, projection 53 and groove 27, as with the previous embodiment, will preclude pinching of the coupler butt 14 against the top wall of the yoke. In all other respects, operation of the yoke 10 and the coupler 15 with the retaining block 50 is exactly the same as that described in connection with the preferred embodiment.

There has been shown in this invention the use of a keyless yoke, having means for simply and efficiently receiving a single retaining block which connects the yoke and the coupler together in operative relationship to the draft gear of a railway vehicle. It has also been shown that such connection is accomplished without creating any interferences with coupler action while buffing and pulling forces are being applied.

The terms and expressions which have been employed are used as terms of description and not of limitation and there is no intention of excluding such equivalents of the invention described or of the portions thereof as fall within the purview of the claims.

What is claimed is:

1. A keyless yoke of the character described comprising, spaced top and bottom arms, spaced side walls, said top arm forwardly extended and said bottom arm having a downwardly offset portion to define with said side walls a forward hollow head portion, said hollow head portion having forward top and bottom integral transverse lugs extending between and joining said side walls, said bottom lug being spaced forwardly in relation to said top lug, said bottom arm extending forwardly to partially overlie said downwardly offset portion and defining therewith a groove, said groove being disposed on the end of said head portion opposite from said bottom lug and defining therewith pocket means to receive an associated retaining block.

2. In a yoke and coupler connection, a yoke having top and bottom horizontal straps; a hollow head portion at the forward end of said yoke formed by said top strap, a bottom wall offset downwardly from said bottom strap, and connecting side walls; the forward end of said top strap having a downwardly extending transverse lug; said bottom wall having its forward end extended upwardly to form a continuous transverse lug extending between and joined to said side walls; a pocket in the lower end of said head portion defined by said bottom wall, the bottom wall lug, and a forward continuation of said bottom strap; a retaining block in said pocket; and a coupler shank butt extending into said head portion having top and bottom transverse shoulders; said block being receivable in said pocket by inserting it through the front end of said head portion from beneath the coupler shank when the latter is moved rearwardly, during assembly, to a position in which the butt is rearward of said pocket; said block having an upwardly extending front abutment wall for engagement with said bottom wall lug along its full extent to prevent movement of the block forwardly of the pocket; said top lug on the head portion being engageable with the top said transverse shoulder and said abutment wall being engageable with said bottom transverse shoulder to transmit pulling forces from the coupler to the yoke.

3. The connection of claim 2 in which said block has a rearward projection underlying said forward continuation of the bottom strap and is adapted for engagement therewith to prevent the block from being tilted upwardly against the coupler butt when pulling forces are applied to the coupler.

4. The connection of claim 2 in which said front wall of the block has a forward extension for engaging the top surface of said bottom wall lug.

5. The connection as set forth in claim 4 in which the forward end of said block is relieved on its underside to facilitate insertion of the block into said pocket during assembly of the yoke and coupler connection.

References Cited in the file of this patent

UNITED STATES PATENTS

| | | |
|---|---|---|
| 1,164,695 | Wrigley | Dec. 21, 1915 |
| 1,198,755 | O'Connor | Sept. 19, 1916 |
| 1,242,852 | Patch | Oct. 9, 1917 |
| 1,279,015 | Schmidt | Sept. 17, 1918 |
| 1,286,305 | Haseltine | Dec. 3, 1918 |
| 1,286,732 | O'Connor | Dec. 3, 1918 |
| 1,730,855 | Launsbury | Oct. 8, 1929 |
| 1,934,866 | Lehman | Nov. 14, 1933 |
| 1,962,313 | Lehman | June 12, 1934 |